UNITED STATES PATENT OFFICE.

WILLIAM McMURTRIE AND BENJAMIN CHAMBERS, JR., OF WASHINGTON, DISTRICT OF COLUMBIA.

IMPROVEMENT IN PROCESSES OF RENDERING ARTIFICIAL STONE IMPERVIOUS TO MOISTURE, AND PREVENTING EFFLORESCENCE THEREON.

Specification forming part of Letters Patent No. 163,676, dated May 25, 1875; application filed May 12, 1875.

*To all whom it may concern:*

Be it known that we, WM. MCMURTRIE and BENJAMIN CHAMBERS, Jr., both of the city of Washington, District of Columbia, have invented an Improved Mode of Rendering Artificial Stone Impervious to Moisture, and of Preventing Efflorescence Thereon, of which the following is a specification:

The object of this invention is to render artificial stone impervious to moisture, and prevent efflorescence thereon, and is effected by adding to the stone, either during manufacture or subsequently, soluble earthy and metallic sulphates, together with the fatty acids, thus forming insoluble compounds within the stone or upon its surface, which fill its pores, render it impervious to moisture, and prevent the exudation of its soluble constituents, which otherwise form white deposits upon its surface.

The invention consists, first, in combining with the constituents of the stone in the process of manufacture in intimate mechanical mixture the soluble earthy and metallic sulphates, singly or together, in the form of powder, then adding to the mass the fatty acids, preferably in solution and in the form of soap; and the invention consists, secondly, in applying to artificial stone, when already made, and also when in use, a solution of the earthy or metallic sulphates, and then a solution of the fatty acids, to prevent the absorption of moisture and consequent deposition upon the surface of the stone of its soluble constituents. The porosity of artificial stone enables it to absorb moisture with great readiness, and this moisture, in case the stone is used for building purposes, is conveyed into the buildings, and renders them damp and unhealthy. A sufficient quantity of it is absorbed to dissolve the soluble constituents of the stone, and carry them to the surface, where, upon evaporation, they are deposited as white stains which deface the stone, and are a serious obstacle to its use for ornamental and building purposes. The present invention removes these difficulties by chemical means. Most of the earthy and metallic bases form, with the fatty acids, compounds insoluble in water, and if such compounds can be formed within the stone or upon its surface its pores will be filled therewith, and its soluble constituents effectually shielded from the action of water. To reach this result we add to the ordinary constituents of the stone in the process of manufacture a relatively small quantity of any of the soluble earthy or metallic sulphates, singly or together, in the form of powder, and mix intimately. To the mixtures thus obtained we add the fatty acids, preferably in solution in the form of soap, in sufficient quantity to doubly decompose with the salt employed, and again we thoroughly mix the mass. The solution of soap will permeate the entire mass, and come in close contact with all its particles. Under these circumstances the oxides of the salt employed will unite with the fatty acids of the soap, forming therewith the insoluble compound desired, while its own acid is liberated to combine with the alkali of the soap. We prefer to use alum in carrying out the process on account of its cheapness and availability, and we use it alone or combined with some other of the soluble, earthy, or metallic sulphates; but when cheapness is not an object we use, for the purpose of varying the color, or for other reasons, other of the salts already mentioned. We may use the metallic and earthy oxides for the purpose of forming within the stone insoluble compounds with the fatty acids, but we prefer to make use of the soluble, earthy, and metallic sulphates for reasons to be given further on in this paper. The proportions of the salts and fatty acids used, as alum and soap, for example, must be determined by circumstances depending upon the other constituents of the stone. Since a given volume of the particular stone employed can only absorb a certain amount of solution of soap without becoming too plastic, the quantity of base will depend upon the quantity of soap used, so care must be taken not to add an excess of the sulphate employed—that is to say, not more than enough to doubly decompose with the soap. The particular advantage arising from the use of sulphates results from the tendency of the sulphuric acid, after neutralizing the alkali of the soap, to combine with the lime of the stone, forming sulphate of lime, which is itself insoluble, and which, consequently, affords an additional protection against the extraction of the soluble matters of the stone by water. We prefer to use soap as the vehicle of the fatty acids in this process on account of its solubility, easy manipulation, and availability, although it is obvious that the other substances, such as the oils, in which such acids occur, are substitutes, which, under some circumstances, could be used instead.

In case the stone is already manufactured, and also when in use, as in buildings, we proceed as follows: The surface of the stone is first cleaned, and a solution of the salt to be used, preferably alum, is applied thereto, and then is applied a solution of soap. The insoluble compound of the base and fatty acids is thus precipitated upon the surface of the stone, and to some extent beneath it, so that an effectual barrier is opposed to the further absorption of moisture by the stone and consequent efflorescence of its soluble constituents. The compounds of the earthy and metallic bases mentioned with the fatty acids are not only insoluble, but when compressed are very compact and tenacious, and contribute these qualities to the stone with which they are incorporated.

We claim as our invention—

1. The process, substantially as described, of rendering artificial stone impervious to moisture, and preventing efflorescence thereon by mixing with the ordinary constituents of the stone in the process of manufacture the soluble, earthy, or metallic sulphates, singly or together, in the form of a powder, and then a solution of the fatty acids.

2. The process, substantially as described, of rendering artificial stone impervious to moisture, and preventing efflorescence thereon by adding to the surface of such stone after manufacture, or already in use, a solution of the earthy or metallic sulphates, and then a solution of the fatty acids.

WM. McMURTRIE.
B. CHAMBERS, Jr.

Witnesses:
  WM. P. YOUNG,
  PHIL. C. RILEY.